(12) United States Patent
Boley et al.

(10) Patent No.: US 6,694,621 B1
(45) Date of Patent: Feb. 24, 2004

(54) POLE-MOUNTED PRUNING DEVICE

(76) Inventors: Robert E. Boley, 1308 New York Ave., Glen Allen, VA (US) 23060-3853; Karen S. Boley, 1308 New York Ave., Glen Allen, VA (US) 23060-3853

( * ) Notice: Subject to any disclaimer, the term of this patent is extended or adjusted under 35 U.S.C. 154(b) by 0 days.

(21) Appl. No.: 10/281,492

(22) Filed: Oct. 29, 2002

(51) Int. Cl.[7] .............................................. B26B 13/26
(52) U.S. Cl. .............................. 30/249; 30/257; 30/211
(58) Field of Search ........................... 30/257, 248, 249, 30/211

(56) References Cited

U.S. PATENT DOCUMENTS

| | | | |
|---|---|---|---|
| 734,557 A | * | 7/1903 | Holybee ....................... 30/249 |
| 3,360,858 A | * | 1/1968 | Cowley ........................ 30/249 |
| 3,835,535 A | * | 9/1974 | Robison et al. ................ 30/249 |
| 4,033,036 A | | 7/1977 | Morris |
| 4,224,739 A | * | 9/1980 | Emblidge ..................... 30/249 |
| 4,696,107 A | * | 9/1987 | Held ............................. 30/246 |
| 4,760,645 A | * | 8/1988 | Davis ........................... 30/249 |
| 5,084,975 A | | 2/1992 | Melter |
| 5,228,202 A | * | 7/1993 | Liao ............................. 30/249 |
| 5,241,752 A | * | 9/1993 | Lutzke et al. ................. 30/249 |
| 5,317,806 A | * | 6/1994 | Held et al. .................... 30/249 |
| 5,613,301 A | | 3/1997 | Sheu |
| 5,634,276 A | * | 6/1997 | Lin ............................... 30/249 |
| 5,743,018 A | | 4/1998 | Wang |

\* cited by examiner

*Primary Examiner*—Allan N. Shoap
*Assistant Examiner*—Phong Nguyen
(74) *Attorney, Agent, or Firm*—Norman Rainer

(57) ABSTRACT

A pruning device for cutting tree limbs includes a head assembly mounted atop an elongated pole and activated by a tether line. The head assembly can be pivoted to various angles relative to the pole axis without impairing the effectiveness of the tether line to apply pulling force for achieving cutting of upwardly angled tree limbs.

6 Claims, 2 Drawing Sheets

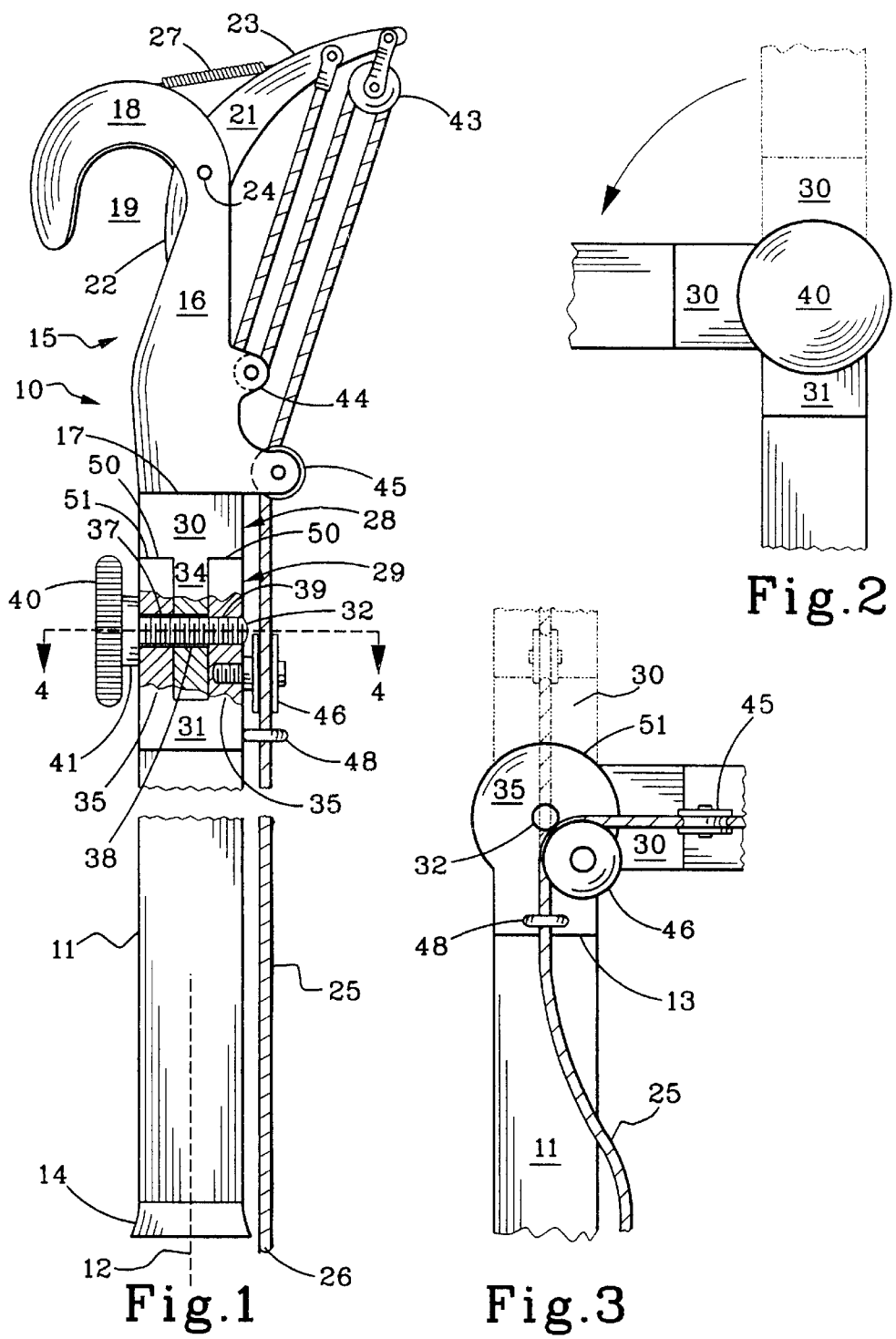

POLE-MOUNTED PRUNING DEVICE

BACKGROUND OF THE INVENTION

1. Field of the Invention

This invention relates to cutting tools, and more particularly concerns pruning shears mounted upon an elongated handle and equipped with an actuating tether deployed along said handle.

2. Description of the Prior Art

Conventional tree and shrub pruners are typically comprised of cutting shears mounted atop a pole of fixed or telescopically adjustable length with an actuating rope or cable extending from said shears to the lowermost extremity of the pole. The shears are generally comprised of a stationary member having a hook configuration disposed in the same plane as the pole, and a cutting blade interactive with the stationary member to sever a limb engaged by said stationary member. The pruning shears are manipulated by holding the pole in one hand and the rope in the other hand in order to pull the rope and thereby force the blade against an engaged limb. The blade is returned to a stand-by starting position by virtue of a restoring spring.

Representative examples of such pruning devices are described in U.S. Pat. Nos. 4,033,036; 4,096,630; 5,084,975; 5,613,301; 5,743,018; 5,996,232 and elsewhere.

Manipulation of the pruning device and actuation of the cutting blade can be difficult, depending upon the height of the limb to be severed, its orientation and location, and the presence of closely adjacent interfering structures. In particular, it is difficult to cut branches which have a nearly vertical orientation because the stationary hook member must engage the branch in such manner that the branch is transversely oriented relative to the pole. Ideally, the branch to be severed is disposed in orthogonal relationship to the pole.

When the pruning device is operated at ground level, the operator can walk around the base of the tree to find the best angle of application of the device for the cutting of a particular branch. However, when the operator is on a rooftop or in some other situation which restricts movement relative to the branch to be severed, considerable difficulty is encountered.

U.S. Pat. No. 4,033,036 to Morris discloses a pole type pruning device wherein the cutting head can be adjustably pivoted to positions wherein the plane of the hook member is disposed between 0 and 90 degrees relative to the pole axis. However, in achieving such adjustability, the upper structure of his pruning device has been weakened, and the force required to effectively pull the rope has been significantly increased.

It is accordingly an object of the present invention to provide a pole type pruning device having a tether-actuated cutting head which is angularly adjustable relative to an elongated supporting pole.

It is another object of this invention to provide an adjustable pruning device as in the foregoing object wherein achievement of adjustability does not adversely affect the strength of the pruning device.

It is a further object of the present invention to provide an adjustable pruning device of the aforesaid nature wherein achievement of adjustability does not significantly increase the amount of pulling force needed to be applied to said rope to actuate said cutting head.

It is yet another object of this invention to provide a pruning device of the aforesaid nature of durable, simple construction amenable to low cost manufacture.

These objects and other objects and advantages of the invention will be apparent from the following description.

SUMMARY OF THE INVENTION

The above and other beneficial objects and advantages are accomplished in accordance with the present invention by a pruning device for cutting tree limbs comprising:

1) a support pole elongated upon a straight axis between upper and lower extremities,
2) a pruner assembly associated with the upper extremity of said support pole and comprised of:
   a) an engaging member having a base portion and an upper portion having a hook shaped configuration defining a downwardly directed gripping region adapted to rest upon a limb intended to be severed, and
   b) a cutting member having a lower blade portion and upper lever arm portion, said cutting member being pivotally joined to said engaging member at a site between said blade and lever arm portions,
3) tether means secured to said lever arm portion and having sufficient length to extend to a free terminal extremity below the lower extremity of said support pole, whereby pulling motion applied to said tether produces forceful traversal of said blade portion through said gripping region,
4) restoring spring means interactive between said engaging member and lever arm portion and biased against the force applied by said pulling motion, and
5) a pivot mechanism interactive between the base portion of said engaging member and the upper extremity of said pole, said pivot mechanism comprising:
   a) a knuckle joint comprised of slideably interactive upper and lower members secured by a threaded tightening bolt upon which rotative motion of said upper member is centered,
   b) a rotating control wheel positioned at a site below said bolt and centered at 45 degrees of angular displacement from said axis, said wheel having a diameter such as to tangentially receive said tether in a straight vertical path, and
   c) an upper guide mounted above said control wheel, and a lower guide positioned below said control wheel, said guides permitting sliding motion of said tether in its direction of elongation but preventing lateral displacement thereof, whereby,
6) said rotative movement of said upper joint member and attached pruner assembly enables said engaging member to be securably positioned at various angles of between 0 and 90 degrees relative to the pole axis in a path parallel to but displaced from said pole axis, and the pulling functionality of said tether remains effective at all positions of said pruner assembly.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a right side view of an embodiment of the pruning device of the present invention with portions broken away, and shown in a straight condition typical of conventional pruning devices.

FIG. 2 is a fragmentary front view of the embodiment of FIG. 1 shown with its pruning head relocated 90 degrees from the axis of the pole handle.

FIG. 3 is a rear view of the embodiment of FIG. 2.

DESCRIPTION OF THE PREFERRED EMBODIMENT

Figure 4:
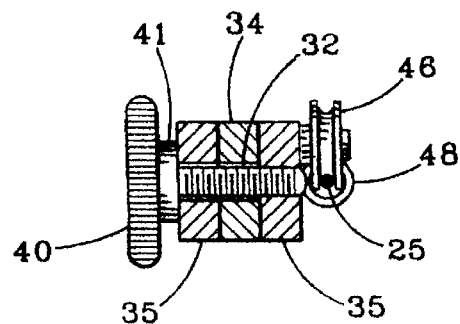
FIG. 4 is a sectional view taken in the direction of the arrows upon the line 4—4 of FIG. 1.
Figure 5:
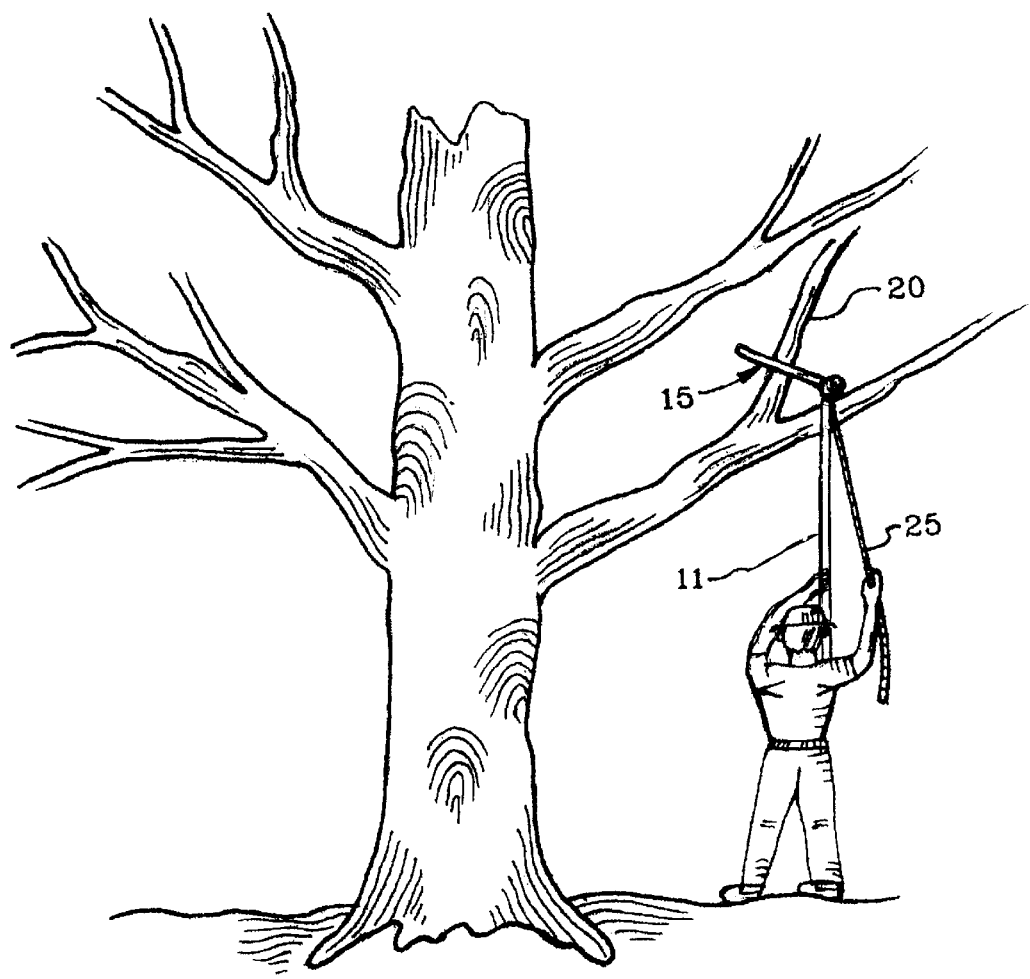
FIG. 5 is a schematic view showing how the pruning device of this invention acts upon a branch of a tree that is directed at a sharp upward angle.

Referring now to FIGS. 1–5, an embodiment of the pruning device 10 of the present invention is shown comprised of support pole 11 elongated upon a straight axis 12 between upper and lower extremities 13 and 14, respectively, and pruner assembly 15 mounted atop said upper extremity.

Support pole 11 may be a single integral member of strong, light construction, but is preferably comprised of upper and lower telescopically interactive members capable of causing the pole to have adjustable lengths between about 8 and 16 feet. The pole may be fabricated of tubular aluminum or fiberglass components resistant to outdoor weathering factors.

Pruner assembly 15 is comprised of engaging member 16 having a base portion 17 and an upper portion 18 having a hook shaped configuration defining a downwardly directed gripping region 19 adapted to rest upon a limb 20 intended to be severed. Said gripping region may have a diametric size ranging between about 2 and 4 inches. A cutting member 21 having a lower blade portion 22 and upper lever arm portion 23, is joined by pivot pin 24 to said engaging member at a site between said blade and lever arm portions. The mounting of said cutting member is such that, when said lever arm portion is moved downwardly, blade portion is caused to traverse said gripping region in an upward motion. In certain embodiments, a saw may extend upwardly from engaging member 16.

Tether means 25, which may be a supple rope, cable or chain, is pendently secured to said lever arm portion. Said tether means has sufficient length to extend to a free terminal extremity 26 below the lower extremity of said support pole. Forceful downward pulling upon said tether means produces the aforesaid movement of said cutting member with consequent severing of limb 20. In the illustrated embodiment, the pulling force applied to said tether is augmented by pulley wheels 43, 44 and 45 operating between engaging member 16 and lever arm portion 23.

Restoring means in the form of coil spring 27 interacts between engaging member 16 and lever arm portion 23 to return blade portion 22 to its starting or stand-by position away from interaction with gripping region 19.

A pivot mechanism 28 is interactive between base portion 17 of engaging member 16 and upper extremity 13 of pole 11. The exemplified embodiment of said pivot mechanism is comprised of knuckle joint 29 including slideably associated upper and lower members 30 and 31, respectively, secured by a threaded tightening bolt 32. Said upper member is adapted to undergo controlled rotative motion about bolt 32, carrying with it said pruner assembly.

In the exemplified embodiment, upper member 30 of said knuckle joint is considered a male component having downwardly directed plate 34 centered on axis 12, and opposed concave bearing shoulders 50. Lower member 31 is considered a female component having paired plates 35 which slideably receive plate 34 and terminate in convex bearing surfaces 51 slideably interactive with shoulders 50. In alternative embodiments, the male and female components can be in reversed positions.

Bolt 32 is shown to penetrate an aperture 37 in one of paired plates 35 and an aligned aperture 38 in associated plate 34, and threadably engages a threaded hole 39 in the opposite paired plate 35. A knurled manipulating knob 40 and abutment collar 41 are disposed upon one extremity of bolt 32. By virtue of such arrangement, pruner assembly 15 can be rotated to angular positions between 0 and 90 degrees relative to axis 12, and secured in said positions by tightening force applied to knob 40. In some embodiments, one or both surfaces of plate 34 may be provided with radially extending ridges adapted to engage matching ridges in paired plates 35. Such feature will provide greater stability of a chosen and locked angular position. It should be noted that the aforesaid construction enables gripping region 19 to move in a path which is parallel to axis 12 but laterally displaced therefrom.

A rotatable control wheel 46 is attached to lower member 31 at a site below bolt 32, and centered at 45 degrees of angular displacement from axis 12. Said control wheel has a diameter such as to tangentially receive tether rope 25 in a straight vertical path thereof.

Pulley wheel 45 serves as an upper guide positioned above upper joint member 30 in orthogonal relationship to control wheel 46. A stationary lower guide 48 is mounted below wheel 46 in vertical alignment with pulley wheel 45. Said upper and lower guides span control wheel 46 and bolt 32, and permit sliding motion of the rope longitudinally, namely along the length of the rope, but not laterally.

When pruner assembly 15 is rotated and locked in a position oriented at 90 degrees relative to pole axis 12, the pruning device is well suited for the cutting of branches that are upwardly oriented at almost vertical angles. The reason is that the cutting blade functions best when orthogonally disposed to a branch within the gripping region. Similarly, other angular positions of the pruning assembly can be chosen for operating on differently directed branches.

It is to be noted that, even in the maximum 90 degree dislocation of the pruner assembly, the effectiveness of the rope is undiminished in applying pulling force to lever arm portion 23. The reason for such retained efficiency is that the apex of the angle defined by the taut rope is centered upon the threaded extremity of bolt 32, and the path of the rope does not encounter frictional restraints in its angled path.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described our invention, what is claimed is:

1. A pruning device for cutting tree limbs comprising:
   a) a support pole elongated upon a straight axis between upper and lower extremities,
   b) a pruner assembly associated with the upper extremity of said pole and comprised of:
      i) an engaging member having a base portion and an upper portion having a hook shaped configuration defining a downwardly directed gripping region adapted to rest upon a limb intended to be severed, and
      ii) a cutting member having a lower blade portion and upper lever arm portion, said cutting member being pivotally joined to said engaging member at a site between said blade and lever arm portions, c) tether means secured to said lever arm portion and having sufficient length to extend to a free terminal extremity below the lower extremity of said support pole, whereby pulling motion applied to said tether produces forceful traversal of said blade portion through said gripping region, d) restoring spring means interactive between said engaging member and lever arm portion and biased against the force applied by said pulling motion, and e) a pivot mechanism interactive between the base portion of said engaging member and the upper extremity of said pole, said pivot mechanism comprising:
   i) a knuckle joint comprised of slideably interactive upper and lower members secured by a threaded tightening bolt upon which rotative motion of said upper member is centered,
   ii) a rotating control wheel positioned at a site below said bolt and centered at 45 degrees of angular displacement from said axis, said wheel having a diameter such as to tangentially receive said tether in a straight vertical path, and
   iii) an upper guide in the form of a wheel mounted above said control wheel, and adapted to rotate in a plane orthogonal to the plane of rotation of said control wheel, and a lower guide positioned below said control wheel, said guides permitting sliding motion of said tether in its direction of elongation but preventing lateral displacement thereof, whereby, f) said rotative movement of said upper joint member and attached pruner assembly enables said engaging member to be securably positioned at various angles of between 0 and 90 degrees relative to the pole axis in a path parallel to but displaced from said pole axis, and the pulling functionality of said tether remains effective at all positions of said pruner assembly.

2. The pruning device of claim 1 wherein the upper member of said knuckle joint is comprised of a single downwardly directed plate, and the lower member is comprised of paired outer plates which slideably receive said downwardly directed plate.

3. The pruning device of claim 2 wherein said control wheel is mounted upon one of said paired outer plates.

4. The pruning device of claim 3 wherein said threaded tightening bolt is provided with a manipulating knob positioned upon one of said paired outer plates which is opposite the outer plate upon which said control wheel is mounted.

5. The pruning device of claim 2 wherein said paired outer plates terminate in upwardly directed convex bearing surfaces.

6. The pruning device of claim 5 wherein said single downwardly directed plate is provided with opposed concave bearing shoulders slideably interactive with said convex bearing surfaces.

\* \* \* \* \*